United States Patent [19]
Ettes et al.

[11] Patent Number: 5,844,374
[45] Date of Patent: Dec. 1, 1998

[54] INVERTER ARRANGEMENT EMPLOYING RESONANT CAPACITIVE ELEMENTS DIRECTLY CONNECTED ACROSS THE SWITCHING ELEMENTS FOR ZERO VOLTAGE SWITCHING

[75] Inventors: Wilhelmus G. M. Ettes, Drachten, Netherlands; Johan P. De Temmerman, Oudenaarde, Belgium

[73] Assignee: U.S. Philips Corporation, New York, N.Y.

[21] Appl. No.: 859,545

[22] Filed: May 20, 1997

[30] Foreign Application Priority Data

May 23, 1996 [EP] European Pat. Off. .............. 96201445

[51] Int. Cl.⁶ .................................................. H05B 37/00
[52] U.S. Cl. ..................... 315/209 R; 315/240; 315/244; 315/DIG. 7
[58] Field of Search .......................... 315/DIG. 7, 209 R, 315/240, 244

[56] References Cited

U.S. PATENT DOCUMENTS

| | | |
|---|---|---|
| 4,415,838 | 11/1983 | Houkes ................................ 315/248 |
| 4,748,383 | 5/1988 | Houkes ................................ 315/248 |
| 5,166,579 | 11/1992 | Kawabata et al. .................. 315/209 R |
| 5,341,068 | 8/1994 | Nerone ................................ 315/210 |
| 5,434,479 | 7/1995 | Ohnishi et al. ......................... 315/209 |
| 5,463,281 | 10/1995 | Linssen ................................ 315/209 |
| 5,565,743 | 10/1996 | Yamashita et al. ..................... 315/308 |

Primary Examiner—Robert J. Pascal
Assistant Examiner—Michael Shingleton
Attorney, Agent, or Firm—Edward Blocker

[57] ABSTRACT

A circuit arrangement for operating a high pressure discharge lamp having a full bridge commutator network. A capacitor across each of four commutator switches forms a tuned circuit together with a ballast coil for soft switching. To counteract the core material of the ballast coil from vibrating audibly during lamp operation about no more than 15% of the commutation cycle elapses between turning off the first of the four commutator swithes and turning on the last of the four commutator switches.

8 Claims, 3 Drawing Sheets

INVERTER ARRANGEMENT EMPLOYING RESONANT CAPACITIVE ELEMENTS DIRECTLY CONNECTED ACROSS THE SWITCHING ELEMENTS FOR ZERO VOLTAGE SWITCHING

BACKGROUND OF THE INVENTION

The invention relates to a circuit arrangement for igniting and operating a high-pressure discharge lamp, which circuit arrangement is provided with input terminals for connection of a supply source, output terminals for connection of the lamp to be operated, a ballast coil for stabilizing the current through the lamp.

The invention also relates to a suntanning apparatus provided with such a circuit arrangement.

A circuit arrangement of the kind mentioned in the opening paragraph is known from the suntanning apparatus, type HB 406, make Philips. The known suntanning apparatus is suitable for supplying and thus operating a 400 W high-pressure mercury discharge lamp through connection to a supply source of 220 V, 50 Hz. The ballast coil is accommodated in a base of the suntanning apparatus in this case. The ballast coil is provided with a metal core material, as is usual in practice.

An adaptation of the circuit arrangement is necessary if the suntanning apparatus is to be used with a supply of 100/110 V, 50 Hz. A widely used possibility is the addition of a transformer for uptransformation of the voltage to be supplied to the ballast coil. An important disadvantage of this is the considerable amount of additional volume required for such a transformer. A further adaptation of the circuit arrangement is required if the suntanning apparatus is to be used with a supply having a frequency of 60 Hz.

SUMMARY OF THE INVENTION

The invention has for its object to provide a measure for eliminating the above disadvantage. According to the invention, the circuit arrangement of the kind mentioned in the opening paragraph is for this purpose characterized in that the output terminals for connection of the lamp to be operated and the ballast coil for stabilizing the current through the lamp form part of a full-bridge commutator network with main switching means which are alternately conducting and non-conducting two by two, and in that rectifying means are present between the input terminals and the commutator network.

The rectifying means may at the same time form a voltage-raising, for example a voltage-doubling network. The commutator network can be operated independently of the frequency of the supply source and is accordingly universally applicable. A considerable saving in volume of the ballast coil can be realized in that the commutator network is made to switch at a comparatively high frequency. This renders it possible to accommodate the circuit arrangement according to the invention in a base of a suntanning apparatus, also if this apparatus is to be suitable for operation on a supply source of 100/110 V, 50/60 Hz.

A familiar problem in the operation of a high-pressure mercury discharge lamp at high frequency is the risk of acoustic resonance occurring in the lamp, which may give rise to unstable burning of the lamp, or even a failure and extinction of the lamp. To prevent this, commutation of the commutator network preferably takes place at a frequency lying in a range between 350 Hz and 500 Hz. This frequency range is advantageous because the lowest possible acoustic resonance has a considerably higher frequency also in a lamp having a high power rating, for example 400 W. It is also possible then to use a conventional metal core material for the ballast coil without this leading to an excessive heat generation in the metal core material of the ballast coil. At frequencies below the range indicated, the reduction in size of the ballast coil which can be realized is so small that it is insufficient for an advantageous use on an industrial scale.

The preferred range for the commutation frequency lies in the region which is audible to the human ear. This may have the result that the core material of the ballast coil, which is often built up from a large number of individual laminations, will start vibrating audibly during lamp operation. To counteract this risk, it was found to be favorable if the main switching means have consecutive switching moments which are mutually different. The commutation frequency then has a commutation cycle, and preferably a time of at most 15% of the commutation cycle elapses between the consecutive switching moments of the main switching means which are alternately conducting and non-conducting two by two. Such a comparatively long time strongly reduces the extent of the current change per unit time (di/dt) through the ballast coil, which is favorable for a limitation of noise generation.

In a further advantageous embodiment of the circuit arrangement according to the invention, the time difference between the switching moments of the main switching means connected to the same output terminal lies within a range from 0.4% to 4% of the commutation cycle. It is achieved thereby on the one hand that no short-circuiting of the full-bridge commutator network, and thus of the lamp, takes place during switching, and on the other hand that it is possible to have one of the two main switching means switch into the conducting state at a strongly reduced voltage level, whereby the generation of radio interference is strongly counteracted and switching losses are further reduced. This is promoted even further in that each main switching means is shunted by a capacitor. The capacitors form a tuned circuit together with the ballast coil during switching, so that switching of a main switching means into the conducting state can take place at a moment when the voltage across the relevant main switching means is substantially zero. Switching to the conducting state in this manner, known as soft switching, of the main switching means is particularly suitable for counteracting switching losses.

BRIEF DESCRIPTION OF THE DRAWINGS

The above and further aspects of the circuit arrangement according to the invention will be explained in more detail with reference to a drawing. In the drawing.

DETAILED DESCRIPTION OF THE PREFERRED EMBODIMENT

Figure 1:
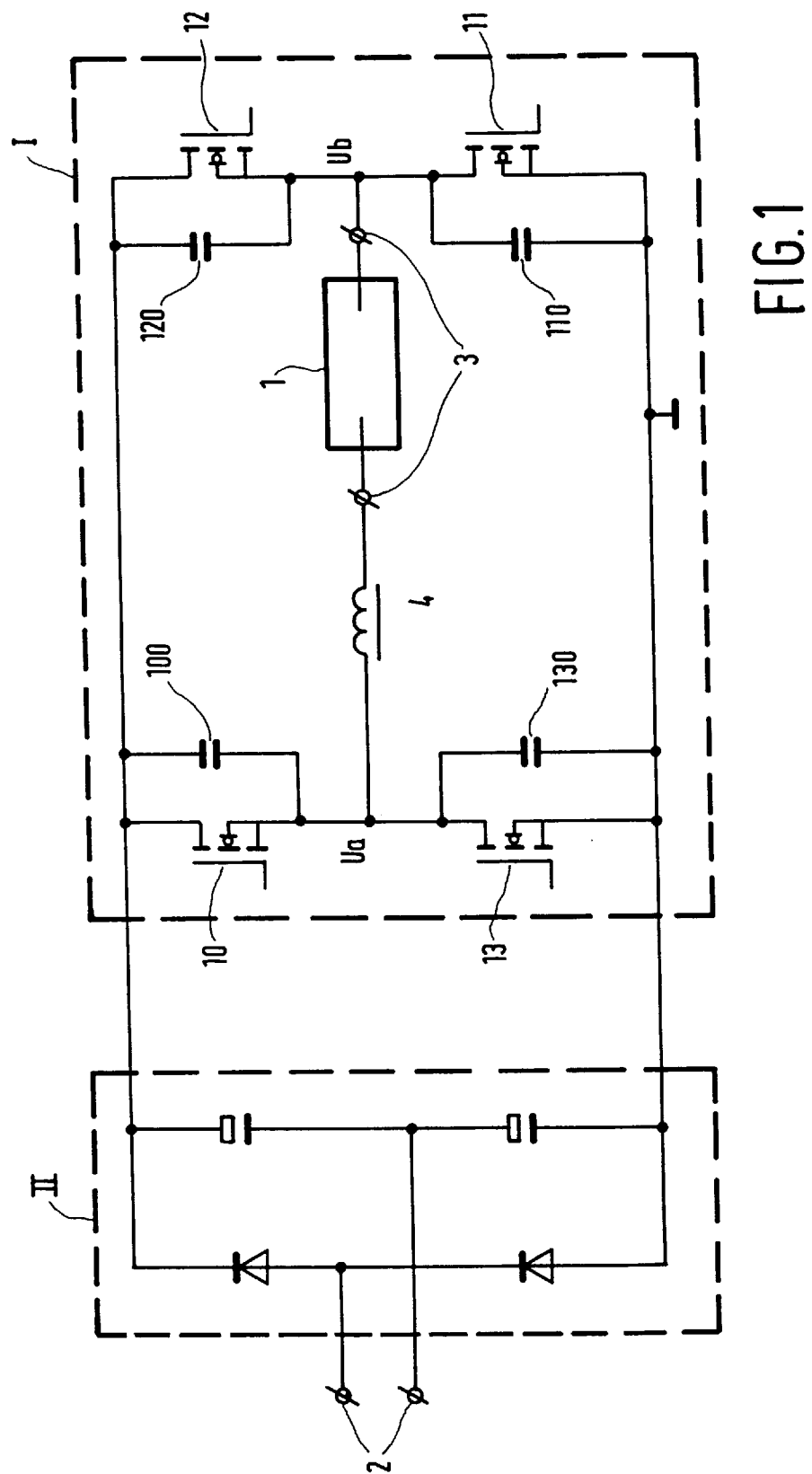
FIG. 1 is a diagram of a circuit arrangement according to the invention.

FIG. 1 represents the circuit diagram of a circuit arrangement for igniting and operating a high-pressure discharge lamp 1, which circuit arrangement is provided with input terminals 2 for connecting a supply source, output terminals 3 for connecting the lamp 1 to be operated, a ballast coil 4 for stabilizing the current through the lamp.

In the circuit arrangement, the output terminals 3 for connecting the lamp 1 to be operated and the ballast coil 4 for stabilizing the current through the lamp form part of a full-bridge commutator network I with main switching means 10, 11, 12, 13 which are alternately conducting and non-conducting two by two. The main switching means are each shunted by a capacitor 110, 110, 120, 130. The capacitors 100, 110, 120, 130 form a tuned circuit together with the ballast coil 4 during switching, so that switching of one of the main switching means 10, 11, 13, 13 into the conducting state can take place at a moment when the voltage across the relevant main switching means is substantially zero.

The main switching means 10 and 13 are connected to the ballast coil via a common junction point Ua and are accordingly connected to one and the same output terminal. Similarly, the main switching means 11 and 12 are connected to one and the same output terminal via a common junction point Ub.

Rectifying means II are present between the input terminals 2 and the commutator network I. The rectifying means in the circuit arrangement shown form at the same time a voltage-doubling network.

Figure 2:
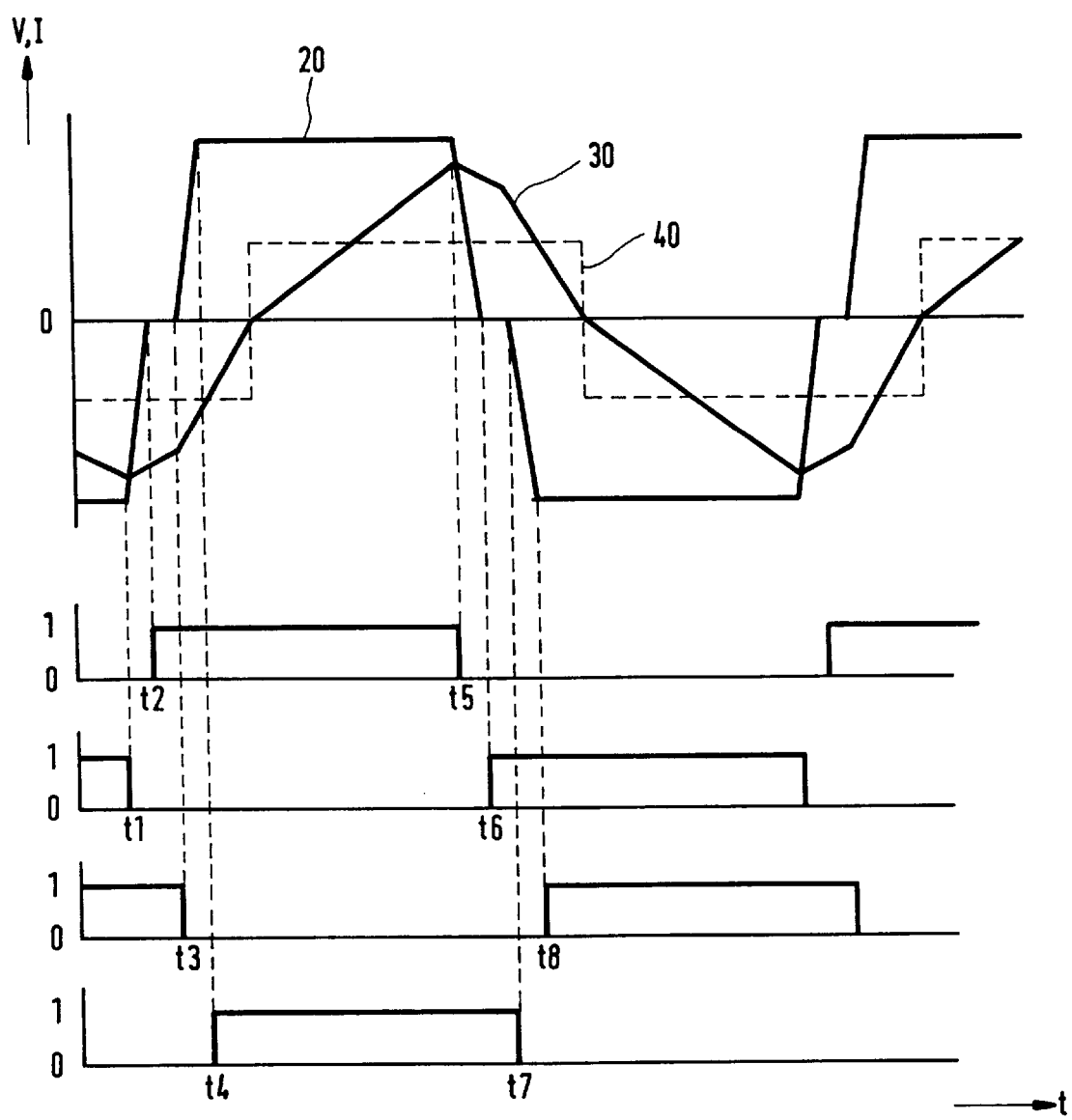
FIG. 2 shows current and voltage gradients in the circuit arrangement as a function of time.

FIG. 2 shows current and voltage gradients in the circuit arrangement as a function of time in an upper graph, and switching states of the main switching means in four graphs below. Time is plotted on the horizontal axis. The voltage and current are plotted in relative units on the vertical axis in the upper graph. In the four lower graphs, the conducting and non-conducting states of the main switching means 10, 13, 12 and 11, in that order, are indicated with 0 and 1, respectively.

In the Figure, 20 denotes the voltage between the junction points Ua and Ub, 30 denotes the current through the lamp 1, and 40 denotes the voltage between the output terminals 3, and thus across the lamp.

At a moment t1, the main switching means 13 switches from the conducting to the non-conducting state. As a result, both the voltage between Ua and Ub and the current through the lamp decrease. The extent of the current change per unit time (di/dt) through the ballast coil and through the lamp remains limited during this. When the voltage between Ua and Ub has become substantially equal to 0 at a moment t2, this will also be true for the voltage across the main switching means 10, and the latter is switched to the conducting state substantially without switching losses. The current through the lamp continues to decrease during this in accordance with the reduced value of di/dt. After some time, i.e. at a moment t3, the main switching means 12 is switched to the non-conducting state. As a result of this, both the voltage between the junction points Ua and Ub and the value of di/dt increase, while the voltage across main switching means 11 drops. When this voltage across main switching means 11 has become substantially equal to zero, the main switching means 11 is switched to the conducting state at a moment t4, and the full-bridge commutator network has been commuted. The fact that di/dt has a reduced value between the moments t1 and t3 was found to be of essential importance for realizing the invention. The moements t1, t2, t3 and t4 form the consecutive switching moments of the main switching means. The consecutive moments t1, t2, t3 and t4 were drawn at mutually equal distances for reasons of clarity in FIG. 2. In a practical realization of the embodiment of the circuit arrangement described, the time elapsing between t1 and t2 and between t3 and t4 on the one hand, and between t1 and t3 on the other hand differ by a factor 20 to 300.

After a commutation cycle has elapsed, the commutation of the commutation network takes place in an analogous manner at the subsequent switching moments t5, t6, t7 and t8.

Figure 3:
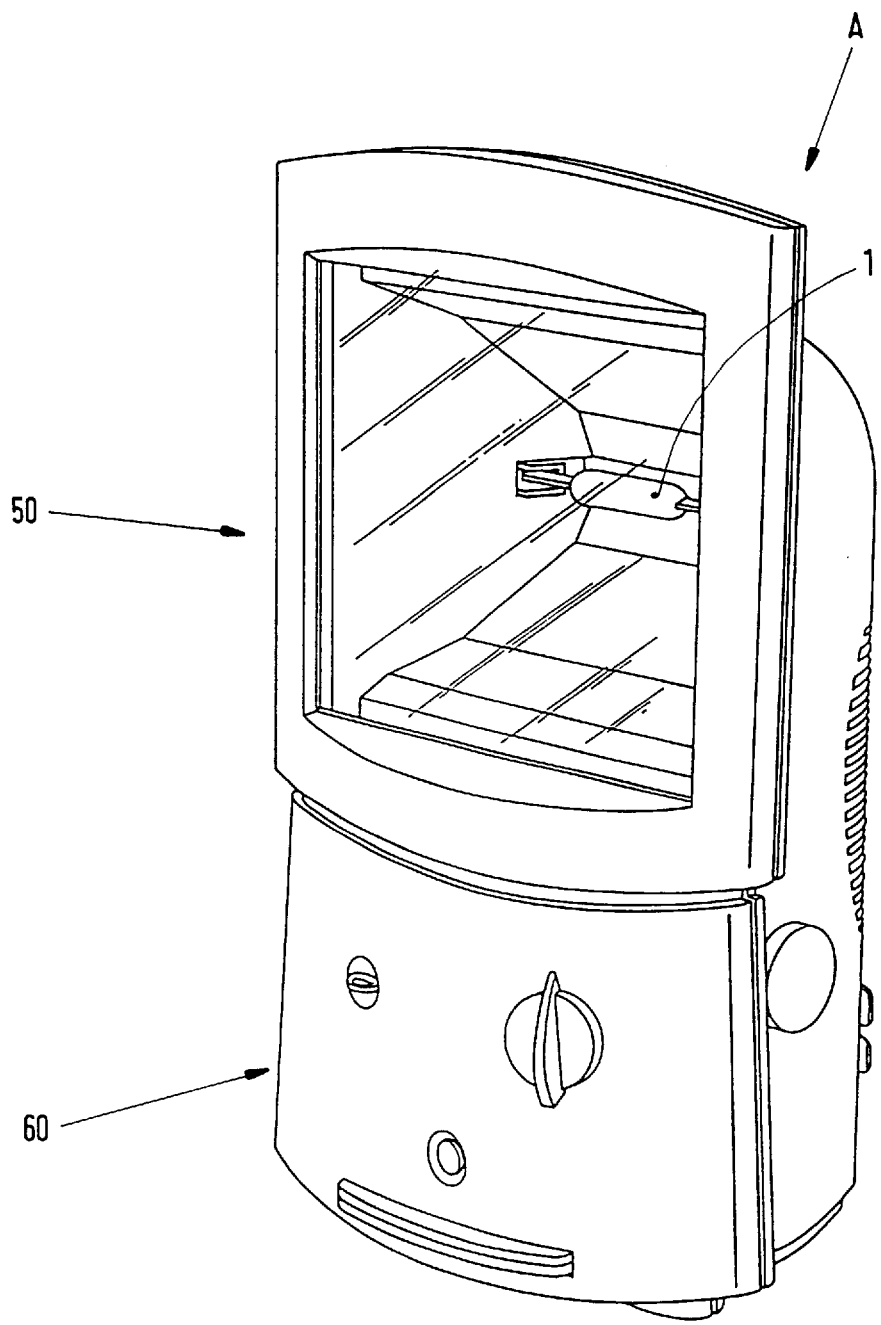
FIG. 3 shows a suntanning apparatus provided with the circuit arrangement of FIG. 1.

FIG. 3 shows a face tanning apparatus A provided with the circuit arrangement according to the invention. The apparatus has a lamp housing 50 provided with a reflector in which the lamp 1 is accommodated. The circuit arrangement is accommodated in a base 60 of the apparatus.

In a practical realization of the circuit arrangement described above, this circuit arrangement forms part of a face tanning apparatus provided with a high-pressure mercury discharge lamp having a power rating of 400 W, type HPA400, make Philips. The main switching means 10, 11, 12, 13 are formed by MOSFETs, type IRF 450, shunted by capacitors 110, 110, 120, 130 of 22 nF. The ballast coil with a self-inductance value of 22 mH contains an E 19Z27 core, make Erea, with 176 turns.

The face tanning apparatus is suitable for operation on a supply source of 100 V, 60 Hz.

The commutation frequency is 400 Hz. A time of 250 $\mu$s elapses between the consecutive switching moments t1, t3 and t2, t4, respectively, of the main switching means 13, 12 and 10, 11, respectively, which are conducting and non-conducting two by two. This time preferably lies between 200 $\mu$s and 375 $\mu$S given the chosen commutation frequency, i.e. between 8% and 15% of the commutation frequency.

The time difference between the switching moments of the main switching means 10, 13 and 11, 12 connected to a same output terminal is 2 $\mu$s. This time difference, which is at least 1 $\mu$s and at most 10 $\mu$s, is preferably chosen to be as small as possible so that a periodic charging and discharging of capacitors present in the circuit arrangement is a minimum during ignition of the lamp.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A circuit arrangement for operating a high-pressure discharge lamp, comprising:

input terminals for connection to a supply source, output terminals for connection of the lamp to be operated, a ballast coil for stabilizing the current through the lamp, wherein the output terminals and the ballast coil form part of a full-bridge commutator network and further including a rectifier coupled between the input terminals and the commutator network and four switches each of which is connected in parallel with an associated capacitor, each capacitor forming a tuned circuit with the ballast coil such that switching of each switch takes place when the voltage across the switch is substantially zero and wherein the commutating frequency has a commutating cycle in which about 15% or less of the commutation cycle elapses between the first of the four switches to be turned off and the last of the four swithes to be turned on.

2. The circuit arrangement as claimed in claim 1, characterized in that commutation of the full-bridge commutator network takes place with a commutation frequency which lies in a range from 350 Hz to 500 Hz.

3. The circuit arrangement as claimed in claim 1, characterized in that the switches of the full-bridge commutator have consecutive switching moments which are mutually different.

4. The circuit arrangement as claimed in claim 2, characterized in that the switches of the full-bridge commutator have consecutive switching moments which are mutually different.

5. The circuit arrangement as claimed in claim 3, characterized in that the time difference in switching moments between any two switches connected to the same output terminal lies within a range from 0.4% to 4% of the commutation cycle.

6. The suntanning apparatus provided with a circuit arrangement as claimed in claim 1, characterized in that the apparatus has a base, and in that the circuit arrangement is accommodated in the base.

7. The circuit arrangement as claimed in claim 4, characterized in that the time difference in switching moments between any two switches connected to the same output terminal lies within a range from 0.4% to 4% of the commutation cycle.

8. The suntanning apparatus as claimed in claim 7, characterized in that the apparatus has a base, and in that the circuit arrangement is accommodated in the base.

* * * * *